US009674512B2

(12) United States Patent
Ni (10) Patent No.: US 9,674,512 B2
(45) Date of Patent: Jun. 6, 2017

(54) METHOD, APPARATUS AND CELL FOR DISPLAYING THREE-DIMENSIONAL OBJECT

(71) Applicant: Wistron Corporation, New Taipei (TW)

(72) Inventor: Shyh-Jye Ni, New Taipei (TW)

(73) Assignee: Wistron Corporation, New Taipei (TW)

( * ) Notice: Subject to any disclaimer, the term of this patent is extended or adjusted under 35 U.S.C. 154(b) by 194 days.

(21) Appl. No.: 14/492,073

(22) Filed: Sep. 22, 2014

(65) Prior Publication Data

US 2015/0325031 A1    Nov. 12, 2015

(51) Int. Cl.
G06T 15/00 (2011.01)
H04N 13/04 (2006.01)

(52) U.S. Cl.
CPC ......... H04N 13/0493 (2013.01); G06T 15/00 (2013.01); G06T 2207/10021 (2013.01); G06T 2207/10024 (2013.01)

(58) Field of Classification Search
None
See application file for complete search history.

(56) References Cited

U.S. PATENT DOCUMENTS

| 2001/0052935 A1* | 12/2001 | Yano | G06T 7/0075 348/207.99 |
| 2007/0053060 A1* | 3/2007 | Jung | H04N 13/0454 359/463 |
| 2010/0238114 A1* | 9/2010 | Vartanian | G06F 3/016 345/168 |
| 2011/0216091 A1* | 9/2011 | Song | G06F 3/033 345/634 |

FOREIGN PATENT DOCUMENTS

WO    2012129357    9/2012

* cited by examiner

Primary Examiner — Said Broome
(74) Attorney, Agent, or Firm — Jianq Chyun IP Office (57) ABSTRACT

A method, an apparatus and a cell for displaying three-dimensional object are provided. The method is adapted to a display having a plurality of cells. In the method, a three-dimensional image data is retrieved. Depth information and color information of each of pixels in the three-dimensional image data are analyzed. Deformation voltages are correspondingly generated according to the depth information and respectively outputted to the cells, so that the cells are deformed to form a three-dimensional object. Discoloration voltages are correspondingly generated according to the color information and respectively outputted to the cells, so that colors of the cells are changed.

9 Claims, 4 Drawing Sheets

METHOD, APPARATUS AND CELL FOR DISPLAYING THREE-DIMENSIONAL OBJECT

CROSS-REFERENCE TO RELATED APPLICATION

This application claims the priority benefit of Taiwan application serial no. 103116539, filed on May 9, 2014. The entirety of the above-mentioned patent application is hereby incorporated by reference herein and made a part of this specification.

BACKGROUND OF THE INVENTION

Field of the Invention

The invention relates to three-dimensional display method and devices, and more particularly, relates to a method, an apparatus and a cell for displaying objects in a three-dimensional image data in real three-dimensional objects.

Description of Related Art

With improvement in technology, in the development of the display technology, a three-dimensional (3D) display technology has gradually replaced the traditional two-dimensional display technology and became main stream of current display technologies. The three-dimensional display technology is capable of clearly exhibiting three-dimensional shapes, orientations and extending directions of the object on the screen, and applying in various fields. For example, in medical research, the traditional medical diagnosis image is restricted to two-dimensional cross-sectional image. Accordingly, when the doctor observes the diagnosis image, a diagnosis deviation may occur because the diagnosis image only shows characteristics in one single aspect. Yet, with assistance of the three-dimensional display technology, the doctor is able to clearly observe all aspects of the diagnosis image to reduce occurrences of misjudgment. Further, in terms of entertainments, when users are watching movie or playing three-dimensional games, the three-dimensional displays technology is capable of exhibiting a visual effect in which objects in the screen are fired towards viewers and flied outside of the screen. As a result, effects of entertainments may be improved since users can usually experience an immersive sensation.

Nonetheless, although images displayed by current three-dimensional display are capable of completely exhibiting all aspects of the objects, the immersive sensation for users is limited only to visual sensations. After all, visual sensations cannot compete to sensations of real touch for users. Therefore, if the display is capable of displaying real objects which are touchable, users may indeed experience an unprecedented sensation of real touch.

SUMMARY OF THE INVENTION

Accordingly, the invention is directed to a method, an apparatus and a cell for displaying a three-dimensional object, in which a special cell structure is utilized to form a real three-dimensional object on a display for the user to feel realness of the object.

The method for displaying three-dimensional object is adapted for a display having a plurality of cells. In the method, a three-dimensional image data is retrieved. Depth information and color information of each of pixels in the three-dimensional image data are analyzed. Deformation voltages are correspondingly generated according to the depth information and respectively outputted to the cells, so that the cells are deformed to form a three-dimensional object. On the other hand, discoloration voltages are correspondingly generated according to the color information and respectively outputted to the cells, so that colors of the cells are changed.

In an embodiment of the invention, the three-dimensional image data includes a left image and a right image, and the step of analyzing the depth information of each of the pixels in the three-dimensional image data includes: calculating an aberration of each of the corresponding pixels in the left image and the right image; and estimating the depth information of each of the pixels according to a focal length of a left lens and a right lens of a three-dimensional imaging unit for capturing the left image and the right image, a lens spacing between the left lens and the right lens, and the aberration of each of the pixels.

In an embodiment of the invention, the step of retrieving the three-dimensional object includes: retrieving a left image and a right image to generate the three-dimensional image data by utilizing a three-dimensional imaging unit.

In an embodiment of the invention, before the step of retrieving the three-dimensional object, the method further includes: respectively retrieving a long shot image and a close shot image at a capturing environment to which the three-dimensional imaging unit is located by utilizing the three-dimensional imaging unit; analyzing the long shot image and the short shot image to obtain a depth range of the capturing environment; and establishing a voltage table according to the depth range, a maximum deformation of the cells, and the deformation voltage applied for generating the maximum deformation. Therein, the voltage table records the deformation voltage corresponding to each of a plurality of depths within the depth range.

In an embodiment of the invention, the step of correspondingly generating the deformation voltages according to the depth information includes: generating the deformation voltages corresponding to the depth information based on the depths and the deformation voltages recorded in the voltage table.

In an embodiment of the invention, a display panel of the display includes a first pixel layer stacked on top of a second pixel layer. Each of the cells in the second pixel layer is disposed below a space between two cells of the first pixel layer. The step of deforming the cells to generate the three-dimensional object includes: when the two cells of the first pixel layer are deformed, deforming the cell of the second pixel layer disposed below the space to fill a gap formed by deforming the two cells.

A cell of the invention includes a deformation body and a discoloration layer. The deformation body includes a plurality of deformation electrodes. The discoloration layer is disposed on an upper surface of the deformation body, and includes a plurality of discoloration electrodes. The deformation body is deformed according the deformation voltage received by the deformation electrodes, and colors of the discoloration layer are changed according to the discoloration voltage received by the discoloration electrodes.

In an embodiment of the invention, the deformation electrodes are coated on at least one lateral side of the deformation body, so that the deformation body generates a longitudinal deformation when the deformation voltages are received through the deformation electrodes.

In an embodiment of the invention, a material of the deformation body includes silicone, or acrylic elastomer VHB 4910, and a material of the discoloration layer includes N-Propanesulfonate, PProDOP, DEPOT, or $WO_3$.

An apparatus for displaying three-dimensional object of the invention includes a processor, a deformation controller, a discoloration controller and a display panel. The processor retrieves a three-dimensional object data, and analyzes depth information and color information of each of a plurality of pixels in the three-dimensional image data. The deformation controller correspondingly generates a plurality of deformation voltages according to the depth information, and the discoloration controller correspondingly generates a plurality of discoloration voltages according to the color information. The display panel receives the deformation voltages and the discoloration voltages, and includes a plurality of cells. Therein, each of the cells includes a deformation body and a discoloration layer. The deformation body includes a plurality of deformation electrodes. The discoloration layer is disposed on an upper surface of the deformation body, and includes a plurality of discoloration electrodes. The deformation body is deformed according the deformation voltage received by the deformation electrodes, and colors of the discoloration layer are changed according to the discoloration voltage received by the discoloration electrodes.

In an embodiment of the invention, the apparatus for displaying three-dimensional object further includes a three-dimensional imaging unit. The three-dimensional imaging unit is used to retrieve a left image and a right image to generate the three-dimensional image data.

In an embodiment of the invention, the processor estimates the depth information of each of the pixels according to a focal length of a left lens and a right lens of the three-dimensional imaging unit for capturing the left image and the right image, a lens spacing between the left lens and the right lens, and an aberration of each of the pixels.

In an embodiment of the invention, the three-dimensional imaging unit respectively retrieves a long shot image and a close shot image at a capturing environment to which the three-dimensional imaging unit is located. The processor analyzes the long shot image and the short shot image to obtain a depth range of the capturing environment, and establishes a voltage table according to the depth range, a maximum deformation of the cells, and the deformation voltage applied for generating the maximum deformation. The voltage table records the deformation voltage corresponding to each of a plurality of depths within the depth range.

In an embodiment of the invention, the apparatus for displaying three-dimensional object further includes a storage unit which is used to record the voltage table.

In an embodiment of the invention, the deformation controller generates the deformation voltages corresponding to the depth information based on the voltage table.

Based on above, in the method, the apparatus and the cell for displaying three-dimensional object of the invention, by analyzing the depth information and the color information of each of the pixels in the three-dimensional image data, the cells of the display are controlled to be deformed while changing colors, so as to exhibit the objects in the three-dimensional image data in real three-dimensional objects. Accordingly, the user may feel as though the object really exists through touching in addition to visual sensations.

To make the above features and advantages of the disclosure more comprehensible, several embodiments accompanied with drawings are described in detail as follows.

DESCRIPTION OF THE EMBODIMENTS

In the invention, elastomeric materials (e.g., silicone, acrylic elastomer VHB 4910 and so on) and electrochromic materials (e.g., N-Propanesulfonate, PProDOP, DEPOT, $WO_3$ and so on) are used to compose a cell of a display, so that each cell includes characteristics of electrochromism and electrostrictive deformation. The invention further analyzes a three-dimensional image data to obtain depth information and color information of each pixel in the three-dimensional image data, and thereby generates deformation voltages and discoloration voltages for deforming and discoloring the cells, respectively. Each of the cells in the display are immediately deformed and discolored after receiving afore-said voltages, so as to realize objects in the three-dimensional image data into real three-dimensional objects.

Figure 1:
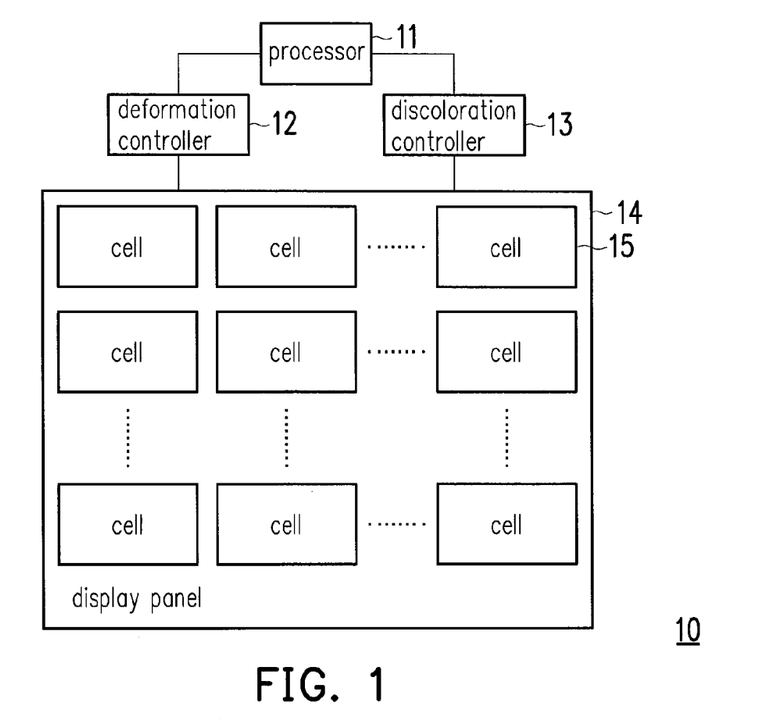
FIG. 1 is a block diagram illustrating an apparatus for displaying three-dimensional object according to an embodiment of the invention.

FIG. 1 is a block diagram illustrating an apparatus for displaying three-dimensional object according to an embodiment of the invention. Referring to FIG. 1, an apparatus for displaying three-dimensional object 10 includes a processor 11, a deformation controller 12, a discoloration controller 13 and a display panel 14. The display panel 14 includes a plurality of cells 15. Each of the cells 15 are arranged on the display panel 14 in parallel.

The processor 11 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices.

The deformation controller 12 is coupled to the processor 11 and the display panel 14. The deformation controller 12 deforms a shape of each of the cells 15 in the display panel 14 according to depth information of each of pixels outputted by the processor 11.

The discoloration controller 13 is coupled to the processor 11 and the display panel 14. The discoloration controller 13 discolors each of the cells 15 in the display panel 14 according to color information of each of pixels outputted by the processor 11. It should be noted that, in the present embodiment, the deformation controller 12 and the discoloration controller 13 are independently disposed outside of the processor 11, whereas in another embodiment, the deformation controller 12 and the discoloration controller 13 may also be integrated into the processor 13, which are not particularly limited in the inventions.

Figure 2:
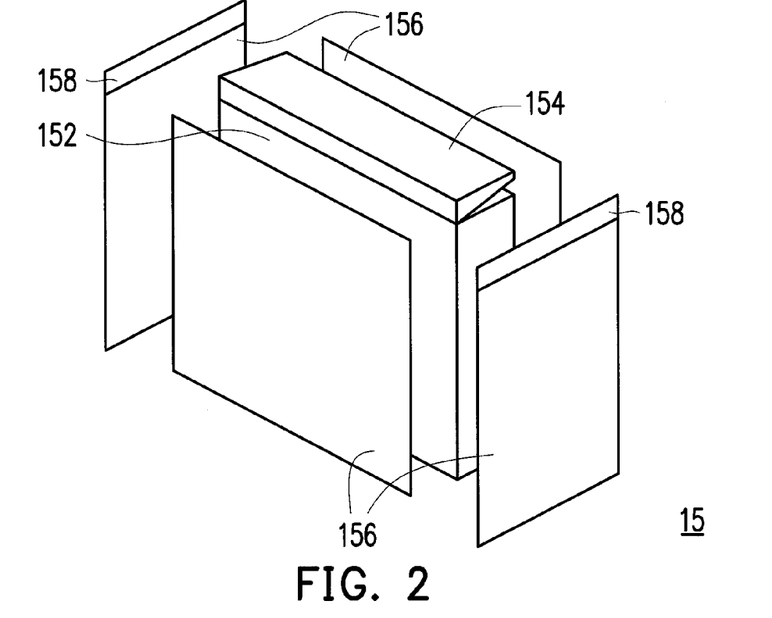
FIG. 2 is a schematic diagram illustrating a cell according to an embodiment of the invention.

Each of the cells 15 in the display panel 14 includes a deformation body and a discoloration layer. For instance, FIG. 2 is a schematic diagram illustrating a cell according to an embodiment of the invention. Referring to FIG. 2, the cell 15 mainly includes a deformation body 152 and a discoloration layer 154, wherein the deformation body 152 is composed of, for example, an elastomeric film, and includes deformation electrodes 156 coated on or attached to lateral sides (e.g. four surrounding sides) of the deformation body 152. The discoloration layer 154 is composed of, for example, an insulating substrate and an electrochromic film coated on an upper surface of the insulating substrate. The discoloration layer 154 is disposed on an upper surface of the deformation body 152, and includes discoloration electrodes 158 coated on lateral sides (e.g. the left and right sides) of the deformation body 152. Amounts and positions of afore-said electrodes are not particularly limited by the invention. The deformation body 152 is deformed according the deformation voltages received by the deformation electrodes 156, and colors of the discoloration layer 154 are changed according to the discoloration voltages received by the discoloration electrodes 158. In addition, a material of the deformation body 152 includes silicone, or acrylic elastomer VHB 4910, and a material of the discoloration layer 154 includes N-Propanesulfonate, PProDOP, DEPOT, or $WO_3$ and so on. In an embodiment, when the deformation body 152 of the present embodiment is deformed after receiving the voltages applied by the deformation electrodes 156 at the lateral sides, a maximum deformation being approximately 380% (which is approximately four times) of its original length may be generated in a longitudinal direction.

Figure 3:
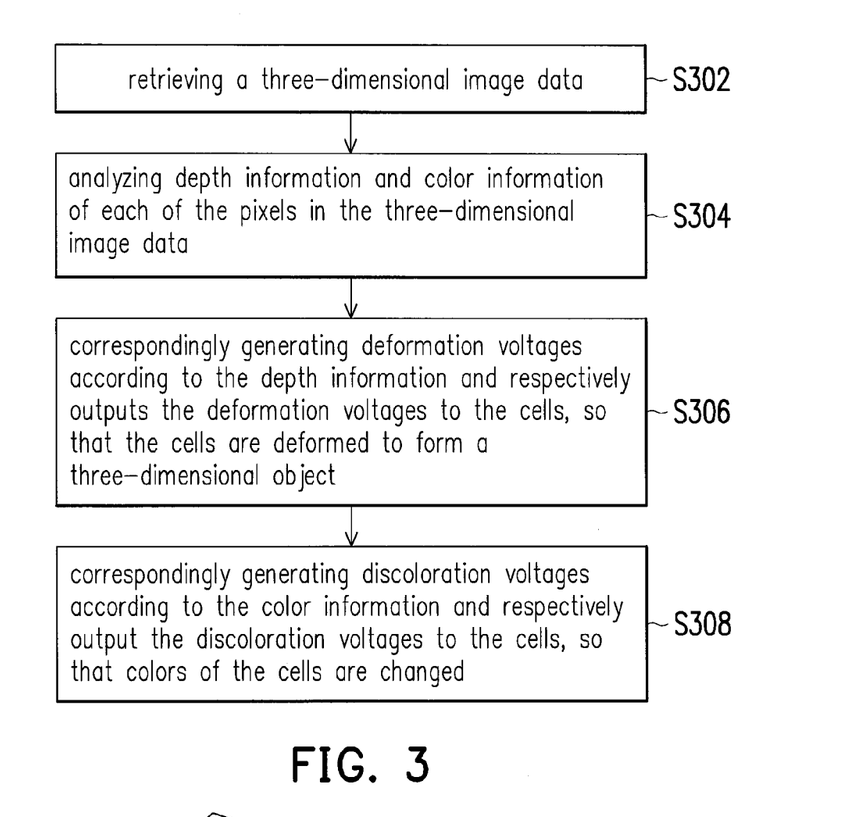
FIG. 3 is a flowchart illustrating a method for displaying three-dimensional object according to an embodiment of the invention.

FIG. 3 is a flowchart illustrating a method for displaying three-dimensional object according to an embodiment of the invention. Referring to FIG. 1, FIG. 2 and FIG. 3 together, a method for displaying three-dimensional object is adapted for the apparatus to display the three-dimensional object 10 of FIG. 1 and the cells 15 of FIG. 2. The following steps are elaborated to describe the method for displaying three-dimensional object by reference with each element of the apparatus for displaying three-dimensional object 10.

In step S302, the processor 11 retrieves a three-dimensional image data. The three-dimensional image data may be an image data retrieved in real time, and may also be an image data obtained from various sources, which is not particularly limited by the invention. Specifically, in an embodiment, the apparatus for displaying three-dimensional object 10 is provided with a three-dimensional imaging unit (not illustrated), and the processor 11 thereof may retrieve a left image and a right image in real time for generating a new three-dimensional image data by utilizing the three-dimensional imaging unit. In an embodiment, the processor 11 may also access the three-dimensional image data previously retrieved and stored in a storage unit (not illustrated) or directly download the three-dimensional image data from the Internet, which is not particularly limited by the invention.

In step S304, the processor 11 analyzes depth information and color information of each of the pixels in the three-dimensional image data. Specifically, the processor 11 may calculate an aberration of each of the corresponding pixels in the left image and the right image in the three-dimensional image data, so as to estimate the depth information of each of the pixels in the three-dimensional image data according to a focal length of a left lens and a right lens of the three-dimensional imaging unit for capturing the left image and the right image, a lens spacing between the left lens and the right lens, and afore-said aberration of each of the pixels. On the other hand, the processor 11 may also obtain the color information of each of the pixels of the left image and the right image in the three-dimensional image data.

In step S306, the deformation controller 12 correspondingly generates deformation voltages according to the depth information and respectively outputs the deformation voltages to the cells 15, so that the cells 15 are deformed to form a three-dimensional object. Specifically, the processor 11 may transmit the depth information obtained after analyzing each of the pixels to the deformation controller 12, so that the deformation controller 12 may generate the deformation voltages corresponding to the depth information of each of the pixels based on the depths and the deformation voltages recorded in a pre-established voltage table, and output the deformation voltages to the corresponding cells 15, respectively. The deformation body 152 of each of the cells 15 generates a longitudinal deformation when receiving the deformation voltages through the deformation electrodes 156. Accordingly, each of the cells 15 arranged on the display panel 14 may generate the longitudinal deformation with different lengths to form the three-dimensional object on the display panel 14.

In step S308, the discoloration controller 13 correspondingly generates discoloration voltages according to the color information and respectively output the discoloration voltages to the cells 15, so that colors of the cells 15 are changed. Specifically, the processor 11 may transmit the color information obtained after analyzing each of the pixels to the discoloration controller 13, so that the discoloration controller 13 may convert the color information of each of the pixels into the corresponding discoloration voltages, and output the discoloration voltages to the corresponding cells 15 in the display panel 14, respectively. The color of the discoloration layer 154 of each of the cells 15 changes after receiving the discoloration voltages through the discoloration electrodes 158. By changing the colors of the discoloration layers 154 on the upper surface of the cells 15, the three-dimensional object formed on the display panel 14 may further exhibit color appearance of the object in addition to three-dimensional appearance. It should be noted that, a magnitude range of the deformation voltages received by the deformation electrodes 156 is not overlapped with a magnitude range of the discoloration voltages received by the discoloration electrodes 158. The deformation voltages fall within a higher voltage range between hundreds to thousands volt for example, whereas the discoloration voltages may fall within a range lower than 10 volt. Accordingly, errors on shapes and colors due to interwork of the deformation voltages and the discoloration voltages received by the cells 15 may be prevented.

Figure 4:
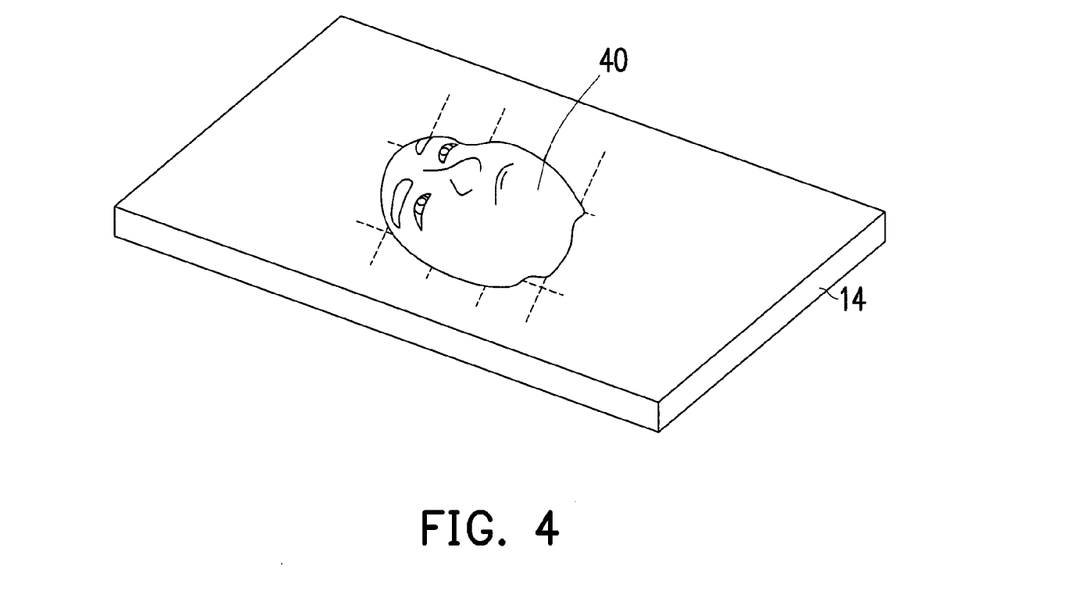
FIG. 4 is an example illustrating a three-dimensional object according to an embodiment of the invention.

For instance, FIG. 4 is an example illustrating a three-dimensional object according to an embodiment of the invention. Referring to FIG. 4, a human-face object 40 of this example is a three-dimensional object formed by utilizing the apparatus for displaying three-dimensional object 10 of FIG. 1. After a user utilizes the apparatus for displaying three-dimensional object 10 to retrieve a human-face image data in three-dimensional, the processor 11 may analyze the depth information and the color information of each of the pixels in the human-face image data. The deformation controller 12 may correspondingly generate deformation voltages according to the depth information and respectively output the deformation voltages to the cells 15 in the display panel 14, so that the cells 15 are deformed to form the human-face object 40 on the display panel 14. On the other hand, the discoloration controller 13 may correspondingly generate discoloration voltages according to the color information, and respectively output the discoloration voltages to the corresponding cells 15 on the display panel 14 for changing the color of each of the cells 15, such that the human-face object 40 is capable of providing colors of the original human-face to further match the appearance of real human-face. It is noted that, this example may be applied to mirror display of the three-dimensional object of the user. Similar to look at the mirror, not only the user can watch the three-dimensional object of himself on the apparatus for displaying three-dimensional object 10, but the user may even touch the three-dimensional object of himself since the three-dimensional object really exists.

It should be noted that, in an embodiment, a new voltage table may be established according to a depth range of a capturing environment in order to allow a scale of the three-dimensional object formed by the apparatus for displaying three-dimensional object matching a scale of the object in the three-dimensional image data, so that the deformation controller may provide the corresponding deformation voltages according to the capturing environment to which the apparatus for displaying three-dimensional object 10 is located. Before the apparatus for displaying three-dimensional object 10 retrieves the three-dimensional image data, the three-dimensional imaging unit may be utilized first to calibrate for the capturing environment, so as to obtain the depth range of the capturing environment. By establishing the new voltage table according to the depth range and the maximum deformation, the deformation controller is capable of correspondingly generating the deformation voltages according to the voltage table of the current capturing environment, such that the cells which receive the deformation voltages may be deformed more precisely. Another embodiment is provided below for persons skilled in the art to further understand the invention more clearly.

Figure 5:
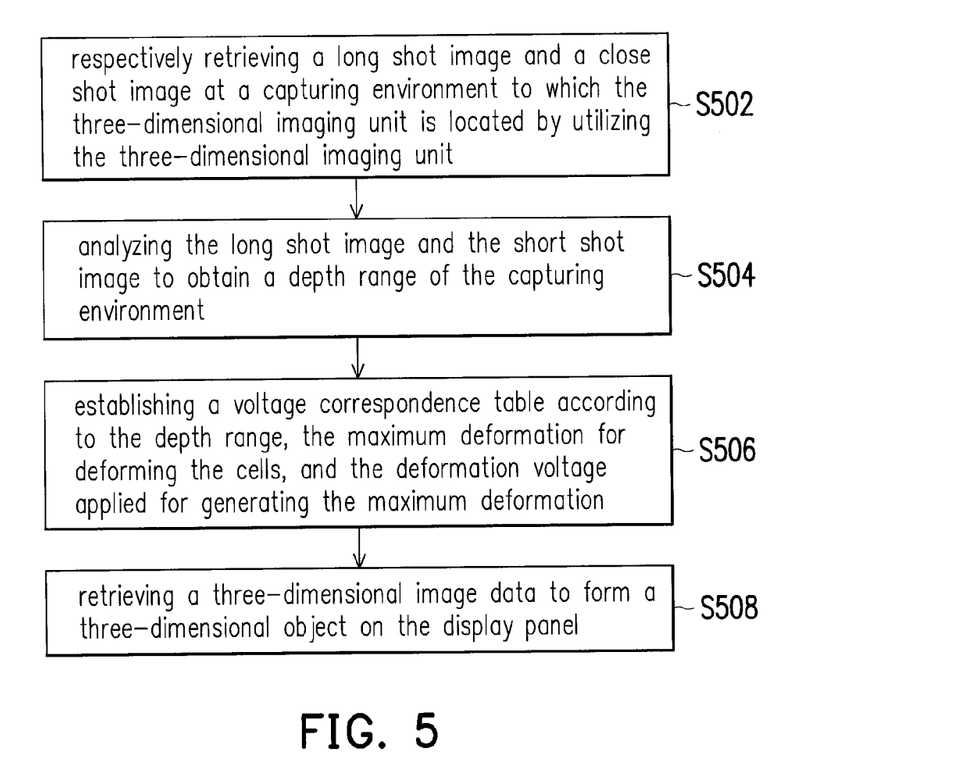
FIG. 5 is a flowchart illustrating a method for displaying three-dimensional object according to an embodiment of the invention.

FIG. 5 is a flowchart illustrating a method for displaying three-dimensional object according to an embodiment of the invention. Referring to FIG. 1 and FIG. 5 together, the method of the invention is adapted to the apparatus for displaying three-dimensional object 10 as described above. Detailed steps in the method of the present embodiment are described as below by reference with each element in the apparatus for displaying three-dimensional object 10 of FIG. 1.

In the present embodiment, the apparatus for displaying three-dimensional object 10 further includes a three-dimensional imaging unit (not illustrated) and a storage unit (not illustrated). The storage unit is used to record the voltage table. In step S502, the processor 11 respectively retrieves a long shot image and a close shot image at a capturing environment to which the three-dimensional imaging unit is located by utilizing the three-dimensional imaging unit. Specifically, the processor 11 retrieves one long shot image with the maximum depth of field and one close shot image with the minimum depth of field at the current capturing environment by utilizing the three-dimensional imaging unit.

In step S504, the processor 11 analyzes the long shot image and the short shot image to obtain a depth range of the capturing environment. Specifically, the processor 11 is capable of analyzing depths of the long shot image and the close shot image according to the left image and the right image of the long shot image as well as the left image and the right image of the close shot image. Accordingly, the processor 11 is capable of calculating a difference between the depths of the long shot image and the close shot image to serve as the depth range of the capturing environment.

In step S506, the processor 11 establishes a voltage table according to the depth range, the maximum deformation of the cells 15, and the deformation voltage applied for generating the maximum deformation. Therein, the voltage table records the deformation voltage corresponding to each of a plurality of depths within the depth range. Specifically, the processor 11 may have a maximum depth in the depth range of the capturing environment corresponding to the maximum deformation of the cells 15, and thereby calculate a deformation of the cell 15 corresponding to each of the depths at such capturing environment according to a proportional relation for each of the depths within the depth range. Lastly, the processor 11 records each of the depths at such capturing environment, the deformation of the cell 15 corresponding to each of the depths and the deformation voltage corresponding to each of the deformations into the newly established voltage table according to the required deformation voltage applied for generating the maximum deformation.

In step S508, the processor 11 retrieves a three-dimensional image data to form a three-dimensional object on the display panel 14. Specifically, the processor 11 retrieves a left image and a left image of a capturing object at such capturing environment by utilizing the three-dimensional imaging unit to generate the three-dimensional image data, and analyzes depth information and color information of the three-dimensional image data. Subsequently, based on the depths and the corresponding deformation voltages as recorded in said newly established voltage table, the deformation controller 12 generates the deformation voltage corresponding to the depth information of each of the pixels to form the three-dimensional object on the display panel 14. A method for forming such three-dimensional object is identical to the method of FIG. 3 in the foregoing embodiment, thus detailed description thereof is omitted hereinafter.

It should be noted that, in foregoing embodiments, a plurality of cells are arranged in parallel on the display panel of the apparatus for displaying three-dimensional object. When the cells generate the longitudinal deformation to form the three-dimensional object, a gap may be generated between adjacent two cells due to the longitudinal deformation. The gaps may be distributed over a surface of the formed three-dimensional object and thereby reduce realness for the appearance of the three-dimensional object. Therefore, to further improve realness for the appearance of the three-dimensional object, the invention further provides a mechanism for filling the gaps. Another embodiment is provided below for further description.

Figure 6A:
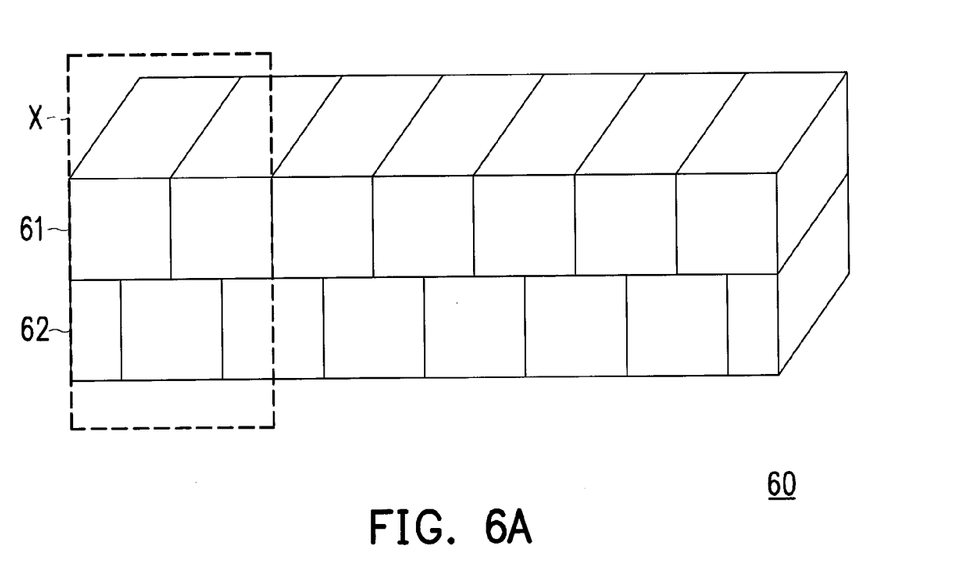
FIG. 6A to FIG. 6C are schematic diagrams illustrating a display panel according to an embodiment of the invention.
Figure 6B:
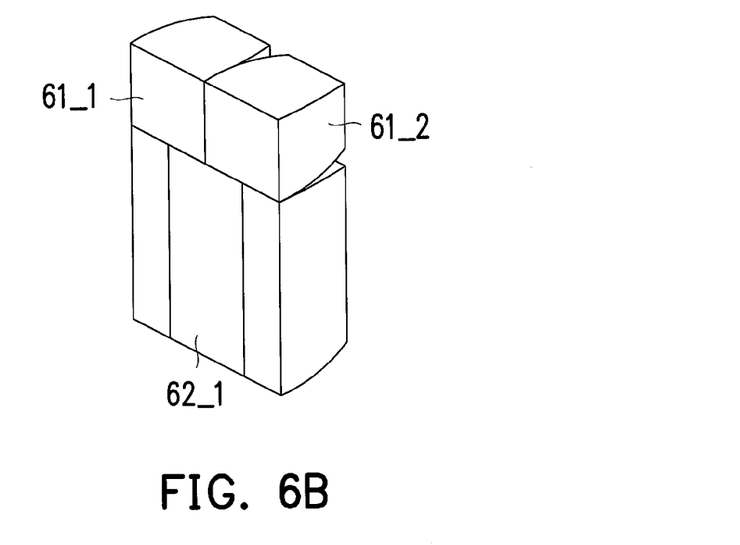

FIG. 6A to FIG. 6C are schematic diagrams illustrating a display panel according to an embodiment of the invention. Referring to FIG. 6A, a display panel 60 of the present embodiment includes a pixel layer 61 on top of a pixel layer 62. The pixel layer 61 includes a plurality of cells arranged in parallel on an upper layer, and the pixel layer 62 includes a plurality of cells arranged in parallel on a lower layer. Furthermore, each of the cells in the pixel layer 62 is disposed below a space between two cells of the pixel layer 61. Subsequently, based on an area X encircled by dashed lines in FIG. 6A, a schematic diagram is illustrated as depicted in FIG. 6B. Referring to FIG. 6B, a cell 62_1 of the pixel layer 62 is disposed below a space between two cells 61_1 and 61_2 of the pixel layer 61.

Figure 6C:
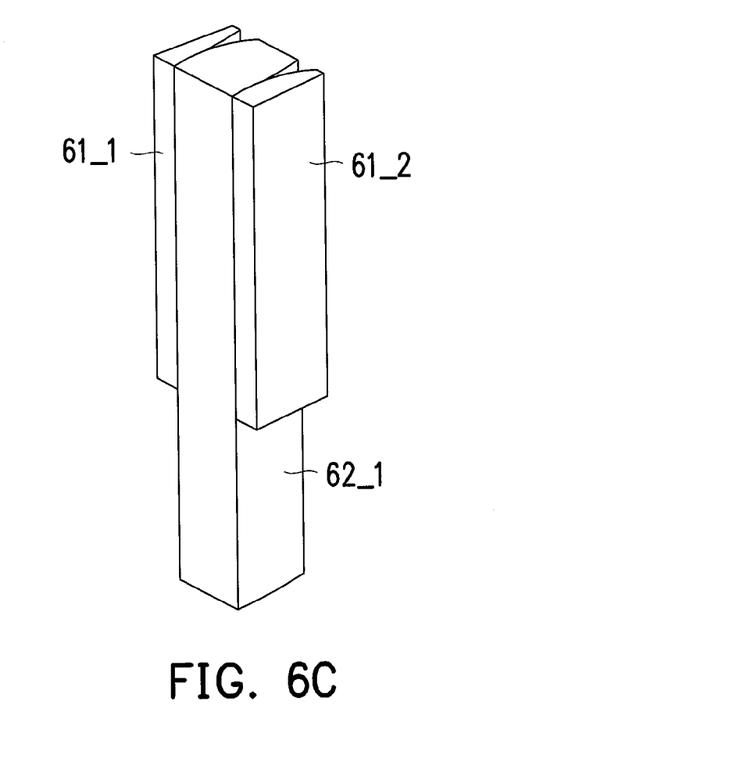

Referring to FIG. 6C, when the deformation voltages are received, the two cells 61_1 and 61_2 of the pixel layer 61 are deformed and extended to generate the gap. In this case, the cell 62_1 of the pixel layer 62 disposed below the space between the cells 61_1 and 61_2 of the pixel layer 61 may also receive the deformation voltages to be deformed for upwardly filling the gap between the cells 61_1 and 61_2. Accordingly, the gaps generated after deforming each cell of the pixel layer 61 may be filled by the cells of the pixel layer 62, so as to improve realness for the appearance of the three-dimensional object formed on the display panel 60.

In summary, the method, the apparatus and the cell for display three-dimensional object of the invention disposes multiple cells including characteristics of electrochromism and electrostrictive deformation in a display panel so as to display the objects in the three-dimensional image data into the real three-dimensional objects, which allows users to feel the appearance of the objects in a more realistic way.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for displaying three-dimensional object, adapted for a display having a plurality of cells, the method comprising:
   retrieving a three-dimensional image data by utilizing a three-dimensional imaging unit, wherein the three-dimensional image data comprises a left image and a right image;
   analyzing depth information and color information of each of a plurality of pixels in the three-dimensional image data, comprising:
   calculating an aberration of each of the corresponding pixels in the left image and the right image; and
   estimating the depth information of each of the pixels according to a focal length of a left lens and a right lens of a three-dimensional imaging unit capturing the left image and the right image, a lens spacing between the left lens and the right lens, and the aberration of each of the pixels;
   correspondingly generating a plurality of deformation voltages according to the depth information, and respectively outputting the deformation voltages to the cells, so that the cells are deformed to form a three-dimensional object; and
   correspondingly generating a plurality of discoloration voltages according to the color information, and respectively outputting the discoloration voltages to the cells, so that colors of the cells are changed,
   wherein before the step of retrieving the three-dimensional image data, the method further comprises:
   respectively retrieving a long shot image and a close shot image at a capturing environment to which the three-dimensional imaging unit is located by utilizing the three-dimensional imaging unit;
   analyzing the long shot image and the short shot image to obtain a depth range of the capturing environment; and
   establishing a voltage table according to the depth range, a maximum deformation of the cells, and the deformation voltage applied for generating the maximum deformation, wherein the voltage table records the deformation voltage corresponding to each of a plurality of depths within the depth range.

2. The method for displaying three-dimensional object of claim 1, wherein the step of correspondingly generating the deformation voltages according to the depth information comprises:
   generating the deformation voltages corresponding to the depth information based on the depths and the deformation voltages recorded in the voltage table.

3. The method for displaying three-dimensional object of claim 1, wherein a display panel of the display comprises a first pixel layer stacked on top of a second pixel layer, wherein each of the cells in the second pixel layer is disposed below a space between two cells of the first pixel layer, wherein the step of deforming the cell to generate the three-dimensional object comprises:
   when the two cells of the first pixel layer are deformed, deforming the cell of the second pixel layer disposed below the space to fill a gap formed by deforming the two cells.

4. An apparatus for displaying three-dimensional object, comprising:
   a three-dimensional imaging unit, retrieving a left image and a right image to generate a three-dimensional image data;
   a processor, retrieving the three-dimensional image data, and analyzing depth information and color information of each of a plurality of pixels in the three-dimensional image data;
   a deformation controller, coupled to the processor, and correspondingly generating a plurality of deformation voltages according to the depth information;
   a discoloration controller, coupled to the processor, and correspondingly generating a plurality of discoloration voltages according to the color information; and
   a display panel, coupled to the deformation controller and the discoloration controller, receiving the deformation voltages and the discoloration voltages, the display panel having a plurality of cells, and each of the cells comprising:
   a deformation body, comprising a plurality of deformation electrodes; and
   a discoloration layer, disposed on an upper surface of the deformation body, and comprising a plurality of discoloration electrodes, wherein
   the deformation body is deformed according the deformation voltage received by the deformation electrodes, and colors of the discoloration layer are changed according to the discoloration voltage received by the discoloration electrodes, and wherein
   the processor estimates the depth information of each of the pixels according to a focal length of a left lens and a right lens of the three-dimensional imaging unit for capturing the left image and the right image, a lens spacing between the left lens and the right lens, and an aberration of each of the pixels, and wherein
   the three-dimensional imaging unit respectively retrieves a long shot image and a close shot image at a capturing environment to which the three-dimensional imaging unit is located, and the processor analyzes the long shot image and the short shot image to obtain a depth range of the capturing environment, and establishes a voltage table according to the depth range, a maximum deformation of the cells, and the deformation voltage applied for generating the maximum deformation, wherein the voltage table records the deformation voltage corresponding to each of a plurality of depths within the depth range.

5. The apparatus for displaying three-dimensional object of claim 4, further comprising:
   a storage unit, recording the voltage table.

6. The apparatus for displaying three-dimensional object of claim 5, wherein the deformation controller generates the deformation voltages corresponding to the depth information based on the voltage table.

7. The apparatus for displaying three-dimensional object of claim 4, wherein wherein the display panel comprises a first pixel layer stacked on top of a second pixel layer, wherein each of the cells in the second pixel layer is disposed below a space between two cells of the first pixel layer, wherein when the two cells of the first pixel layer are deformed, the cell of the second pixel layer disposed below the space are deformed to fill a gap formed by deforming the two cells.

8. The apparatus for displaying three-dimensional object of claim 4, wherein the deformation electrodes are disposed on at least one lateral side of the deformation body, so that the deformation body generates a longitudinal deformation when the deformation voltages are received through the deformation electrodes.

9. The apparatus for displaying three-dimensional object of claim 4, wherein a material of the deformation body comprises silicone, or acrylic elastomer VHB 4910, and a material of the discoloration layer comprises N-Propanesulfonate, PProDOP, DEPOT, or $WO_3$.

* * * * *